UNITED STATES PATENT OFFICE.

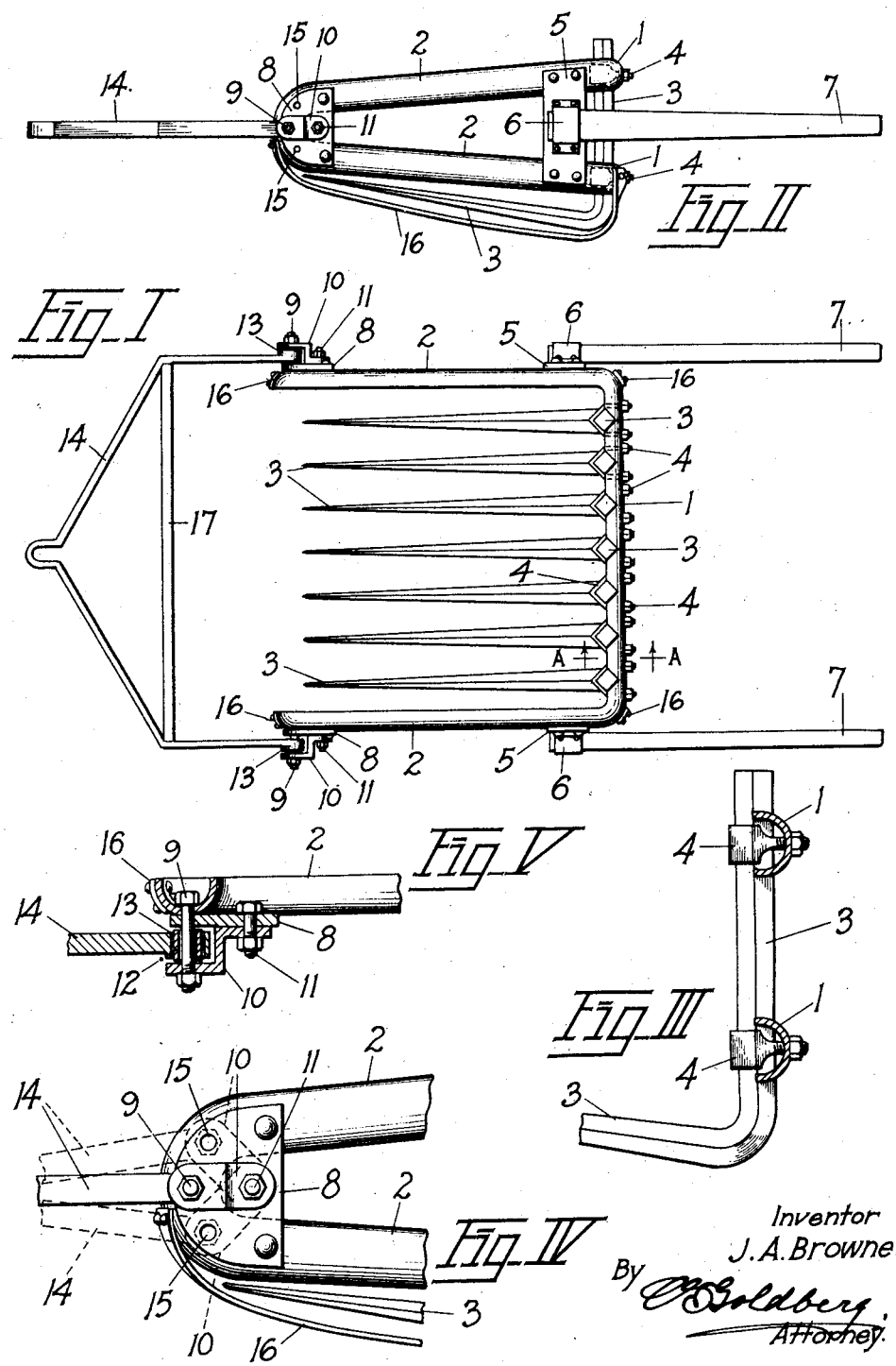

JOSEPH A. BROWNE, OF PORTLAND, OREGON.

STONE RAKER.

1,405,750.  Specification of Letters Patent.  Patented Feb. 7, 1922.

Application filed July 18, 1921. Serial No. 485,612.

*To all whom it may concern:*

Be it known that I, JOSEPH A. BROWNE, a citizen of the United States, residing at Portland, in the county of Multnomah and State of Oregon, have invented a new and useful Stone Raker, of which the following is a specification.

My invention relates to stone rakers, in which a large shovel composed of a plurality of tines is dragged flat over the ground.

The objects of my invention are to provide a mechanism which is comparatively simple to construct and enables farmers and road workers to clear a field or road quickly of stones and rocks.

Another object is to make provisions for the ready removal of the tines either for repair, or to obtain a wider spacing for the collection of larger sized stones only.

A further object is to provide an adjustment whereby the points of the tines will be enabled to enter the ground at a desired depth.

Other objects and advantages will appear from the description given hereinafter.

I attain these objects with the mechanism illustrated in the accompanying drawing, in which—

Fig. I is a plan view of the entire mechanism.

Fig. II is a side elevation of Fig. I.

Fig. III is a section through Fig. I along the line A—A.

Fig. IV illustrates the manner of attaching the bail to the frame.

Fig. V is a horizontal cross section through Fig. IV.

Similar numerals refer to similar parts throughout the several views.

A bar of semi-tubular metal is first bent into a closed rectangular frame, and then around its minor axis through approximately 180 degrees; this results in a construction composed of two half-frames superimposed upon and endlessly connected with each other. The two ends of the former rectangular frame, in their present juxtaposition, shall henceforth be collectively referred to as the rear railing 1, and the sides as side railing 2. The semi-tubular form of the individual members is shown in Fig. III.

The two members of the rear railing are provided with notches, vertical in alinement with each other; and in the notches repose the vertical members of the tines 3 held firmly yet removably in place by the clamps 4. The horizontal members of the tines form the bottom of my raker and terminate in points approximately even with the front ends of the side railings. A plate 5 cross the upper and lower members of the side railings near the rear, stiffens the frame, acts as a partial side wall, and serves to affix the socket 6 into which the handle 7 may be inserted. A similar plate 8 near the front end of the side railings serves as one of the bearings for the pintle 9, the other bearing being furnished by a Z-shaped link 10 which is pivotally attached at 11 to the plate 8. On the pintle between the bearings is a pipe sleeve 12, and onto the pipe sleeve is slipped the eye 13 of the bail 14. The pipe sleeve is intended to prevent excessive wear between eye and pintle.

By transferring the point of action for the bail, as indicated by the dotted lines in Fig. IV, to the upper or lower hole 15, the points of the tines can be caused to slide through the ground at the desired depth.

Runners 16 extending under the side railings from the front to the rear, slightly below the level of the tines, cause the raker to slide easier over the ground. Horses or tractors may be employed to pull the raker.

A wooden brace 17 between the legs of the bail imparts the requisite stiffness to the latter.

Having thus described my invention, it will be seen that my objects have been accomplished and, though I have described the preferred form of construction I reserve to myself the right to make minor changes providing I do not violate the spirit and principle of my invention.

I claim—

1. In a stone raker, the combination of a frame construction comprising a rear railing, and side railings at right angles to the rear railing, with a bottom between the railings, said bottom composed of a plurality of tines removably attached to the rear railing, and a bail secured to the front end of the side railings.

2. In a stone raker, the combination of two half-frames of semi-tubular metal superimposed upon and joined endlessly with each other, forming thereby a rear railing and side railings, with a bottom composed of a plurality of tines, runners attached to the side railing below the level of the tines, and a bail secured to the front end of the side railings.

3. In a stone raker, the combination of a frame construction having a rear railing, and side railings, tines bent at right angles and secured with their vertical legs to the rear railing, clamps to hold the tines to the rear railing, the horizontal legs of the tines forming a bottom between the railings, handles extending rearwardly of the raker, and a bail adjustably secured to the front end of the side railings.

Signed by me at Portland, Oregon, this 12th day of July, 1921.

JOSEPH A. BROWNE.